US011682130B2

(12) United States Patent
Poulad et al.

(10) Patent No.: US 11,682,130 B2
(45) Date of Patent: Jun. 20, 2023

(54) DEVICE CASE INCLUDING A PROJECTOR

(71) Applicant: Microsoft Technology Licensing, LLC, Redmond, WA (US)

(72) Inventors: Navid Poulad, San Jose, CA (US); Roy Joseph Riccomini, Saratoga, CA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 17/354,508

(22) Filed: Jun. 22, 2021

(65) Prior Publication Data
US 2022/0405950 A1  Dec. 22, 2022

(51) Int. Cl.
| | | |
|---|---|---|
| *G06T 7/521* | (2017.01) | |
| *G06T 7/80* | (2017.01) | |
| *G06T 7/593* | (2017.01) | |
| *H04N 13/332* | (2018.01) | |
| *H04N 13/254* | (2018.01) | |
| *H04N 13/239* | (2018.01) | |

(Continued)

(52) U.S. Cl.
CPC .......... *G06T 7/521* (2017.01); *G02B 27/0172* (2013.01); *G02B 30/34* (2020.01); *G06T 7/593* (2017.01); *G06T 7/80* (2017.01); *H04N 13/239* (2018.05); *H04N 13/254* (2018.05); *H04N 13/332* (2018.05); *H04N 23/71* (2023.01); *H04N 23/74* (2023.01); *G02B 2027/014* (2013.01); *G02B 2027/0134* (2013.01); *G02B 2027/0138* (2013.01); *G02B 2027/0174* (2013.01); *G02B 2027/0178* (2013.01); *G06T 2207/10028* (2013.01); *G06T 2207/10048* (2013.01); *G06T 2207/30244* (2013.01); *H04N 2013/0081* (2013.01)

(58) Field of Classification Search
CPC ........... G06T 7/521; G06T 7/593; G06T 7/80; G06T 2207/10028; G06T 2207/10048; G06T 2207/30244; G02B 27/0172; G02B 30/34; G02B 2027/0134; G02B 2027/0138; G02B 2027/014; G02B 2027/0174; G02B 2027/0178; H04N 5/2351; H04N 5/2354; H04N 13/239; H04N 13/254; H04N 13/332; H04N 2013/0081
USPC ......................................................... 348/47
See application file for complete search history.

(56) References Cited

U.S. PATENT DOCUMENTS

| | | | | |
|---|---|---|---|---|
| 2018/0046874 A1* | 2/2018 | Guo | .......................... | G06T 7/74 |
| 2018/0061034 A1* | 3/2018 | Zhao | ....................... | G06T 7/521 |

(Continued)

OTHER PUBLICATIONS

"International Search Report and Written Opinion Issued in PCT Application No. PCT/US22/029089", dated Aug. 19, 2022, 12 Pages.

*Primary Examiner* — Susan E. Torgerson
(74) *Attorney, Agent, or Firm* — Alleman Hall Creasman & Tuttle LLP (57) ABSTRACT

One disclosed example provides a method for displaying a hologram via a head-mounted display (HMD) device. The method comprises, via a camera system on the HMD device, acquiring image data capturing a surrounding environment by detecting illumination light output by a projector located on a case for the HMD device. A distance is determined from the HMD device to an object in the surrounding environment based upon the image data. The method further comprises displaying via the HMD device a hologram, the hologram comprising a left-eye image and a right-eye image each having a perspective based upon the distance determined.

20 Claims, 9 Drawing Sheets

(51) Int. Cl.
   *G02B 27/01*   (2006.01)
   *H04N 5/235*   (2006.01)
   *G02B 30/34*   (2020.01)
   *H04N 23/71*   (2023.01)
   *H04N 23/74*   (2023.01)
   *H04N 13/00*   (2018.01)

(56) References Cited

U.S. PATENT DOCUMENTS

2018/0131847 A1*   5/2018   Kokonaski .............. H02J 50/10
2019/0304116 A1   10/2019   Price et al.
2019/0355138 A1*  11/2019   Hall ................... G02B 27/0172

* cited by examiner

```
┌─────────────────────────────────────────────────────────────┐
│ VIA A CAMERA SYSTEM ON HMD DEVICE, ACQUIRE IMAGE DATA       │
│ CAPTURING A SURROUNDING ENVIRONMENT BY DETECTING            │
│ ILLUMINATION LIGHT OUTPUT BY A PROJECTOR LOCATED ON A       │
│ CASE FOR THE HMD DEVICE 802                                 │
│                                                             │
│   ┌─────────────────────────────────────────────────────┐   │
│   │ ILLUMINATION LIGHT COMPRISES STRUCTURED LIGHT       │   │
│   │ PATTERN 804                                         │   │
│   └─────────────────────────────────────────────────────┘   │
│   ┌─────────────────────────────────────────────────────┐   │
│   │ ILLUMINATION LIGHT COMPRISES UNSTRUCTURED LIGHT 806 │   │
│   └─────────────────────────────────────────────────────┘   │
│   ┌─────────────────────────────────────────────────────┐   │
│   │ ILLUMINATION LIGHT COMPRISES INFRARED LIGHT 808     │   │
│   └─────────────────────────────────────────────────────┘   │
│   ┌─────────────────────────────────────────────────────┐   │
│   │ IMAGE DATA COMPRISES STEREO IMAGE DATA 809          │   │
│   └─────────────────────────────────────────────────────┘   │
│   ┌─────────────────────────────────────────────────────┐   │
│   │ TRANSMIT AN INSTRUCTION FROM THE HMD DEVICE TO THE  │   │
│   │ CASE TO OUTPUT THE ILLUMINATION LIGHT 810           │   │
│   └─────────────────────────────────────────────────────┘   │
│   ┌─────────────────────────────────────────────────────┐   │
│   │ RECEIVE USER INPUT TRIGGERING THE OUTPUT OF         │   │
│   │ ILLUMINATION LIGHT 812                              │   │
│   └─────────────────────────────────────────────────────┘   │
└─────────────────────────────────────────────────────────────┘
                              │
                              ▼
┌─────────────────────────────────────────────────────────────┐
│ DETERMINE A DISTANCE TO AN OBJECT IN THE SURROUNDING         │
│ ENVIRONMENT BASED UPON THE IMAGE DATA 814                    │
└─────────────────────────────────────────────────────────────┘
                              │
                              ▼
┌─────────────────────────────────────────────────────────────┐
│ DISPLAY VIA THE HMD DEVICE A HOLOGRAM COMPRISING A LEFT-EYE │
│ IMAGE AND A RIGHT-EYE IMAGE EACH HAVING A PERSPECTIVE        │
│ BASED UPON THE DISTANCE DETERMINED 816                       │
│   ┌─────────────────────────────────────────────────────┐   │
│   │ DISPLAYING THE HOLOGRAM AT A LOCATION REFERENCED    │   │
│   │ TO THE OBJECT 818                                   │   │
│   └─────────────────────────────────────────────────────┘   │
└─────────────────────────────────────────────────────────────┘
```

DEVICE CASE INCLUDING A PROJECTOR

BACKGROUND

An augmented reality head-mounted display (HMD) device may use depth information to display holograms with respect to a real-world environment. For example, an augmented reality HMD device may use an on-board depth camera to generate a depth map of the real-world environment. The depth map can be used to compute holographic imagery for display via a see-through display device of the HMD.

SUMMARY

Examples are disclosed that relate to displaying a hologram via a head-mounted display (HMD) device. One disclosed example provides a method comprising acquiring, via a camera system on the HMD device, image data capturing a surrounding environment by detecting illumination light output by a projector located on a case for the HMD device, and determining a distance to a feature in the surrounding environment based upon the image data. The method further comprises displaying via the HMD device the hologram, the hologram comprising a left-eye image and a right-eye image each having a perspective based upon the distance determined.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
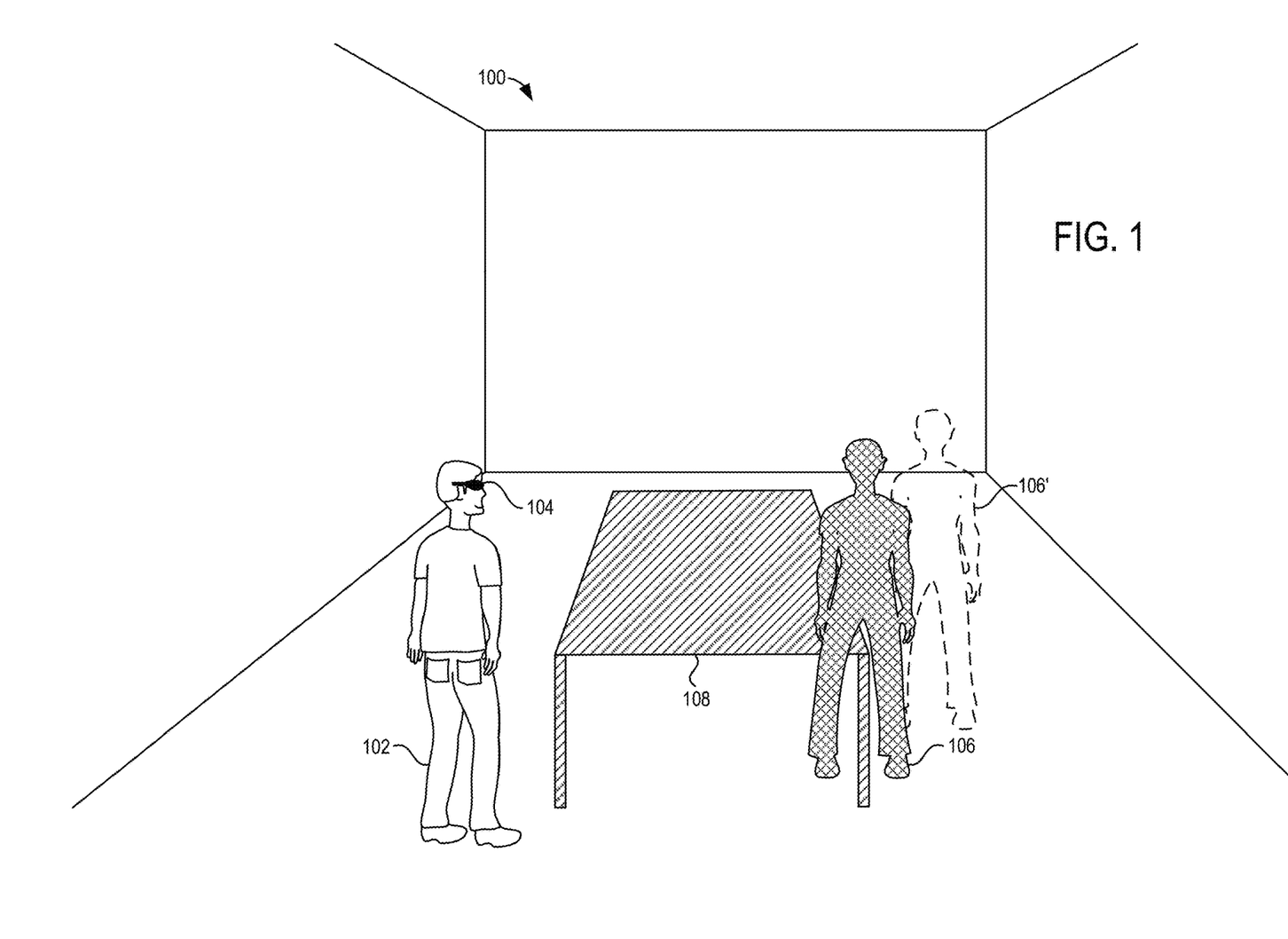
FIG. 1 shows a scenario in which an example head-mounted display (HMD) device presents holographic imagery based upon incorrect distance information due to low light conditions.

As introduced above, an augmented reality head-mounted display (HMD) device uses depth information to display holograms with respect to a real-world environment. FIG. 1 shows one example of a real-world environment in the form of a room 100 in which a user 102 is wearing an HMD device 104. The HMD device 104 is used to display a hologram 106.

The HMD device 104 can use depth imaging to determine a distance between the device 104 and one or more objects in the environment (e.g., an edge of a table 108), and to generate a depth map of the real-world environment 100. The depth map is used to determine a placement of the hologram, including a position, an orientation, and/or a scale factor for the hologram.

Some HMD devices may use a stereo camera system comprising a pair of two-dimensional cameras at spaced-apart locations on the HMD device to determine depth by performing triangulation. However, it can be challenging for the cameras of the stereo camera system to image features of poorly lit environments. This can result in the improper display of holograms. For example, the HMD device 104 may intend to display the hologram 106 adjacent to a table 108, at location 106'. However, in a dark environment, the HMD device 104 may not have an accurate sense of where an edge of the table 108 is located, and may erroneously place the hologram at the position of hologram 106, where it appears to be on or extending through the table 108.

Figure 2:
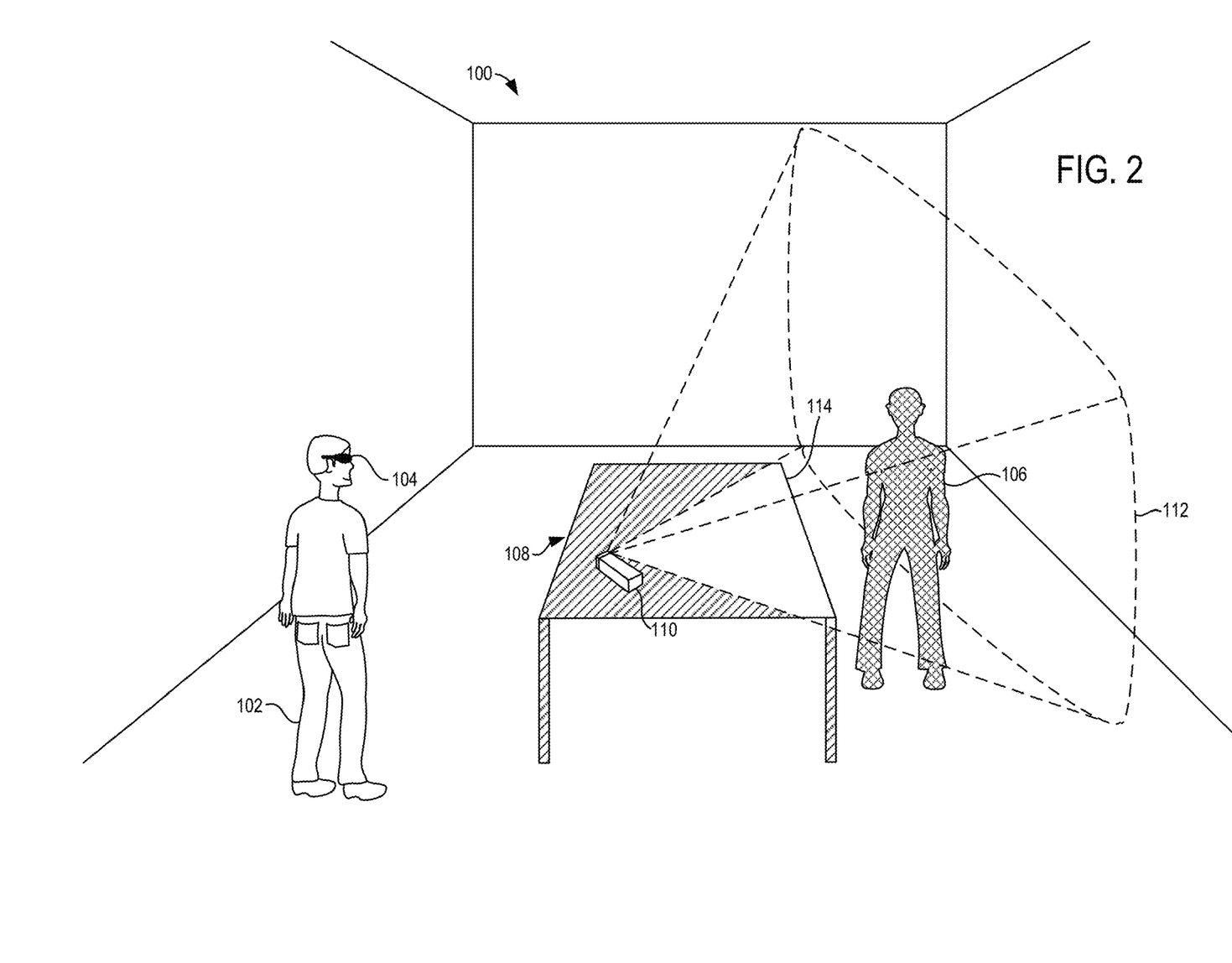
FIG. 2 shows the scenario of FIG. 1, in which the holographic imagery is displayed correctly by using illumination light output by a projector located on a case for the HMD device.

Thus, examples are disclosed that relate to a wearable device case comprising a projector to facilitate the placement of holograms by a wearable device. Briefly, a projector on a wearable device case can output suitable illumination to allow a stereo camera system of the wearable device to acquire image data with higher signal-to-noise ratios compared to image data acquired without the use of a projector on a case under similar lighting conditions. Referring to FIG. 2, the illumination of the use environment 100 by a projector on HMD case 110 may allow the HMD 104 to display the hologram 106 in an intended location. In some examples, the projector on the case may output structured light comprising a pattern, such that distortions in the pattern can provide additional information and contrast for stereo depth imaging. Such a pattern may or may not include repeating or symmetrical features. In other examples, the projector may output unstructured light.

While described in the context of a stereo imaging system herein, a structured light pattern projected by a device case also may be used to acquire depth information using a single camera, where the camera and device case are calibrated to one another. In such an example, the relative orientation of the camera with respect to the case can be determined by starting from an initial calibration between the camera and the projector and obtaining an image of the structured light at the camera. Rotation about a roll axis between the camera and the projector can be identified by comparing the image to the initial calibration. Pitch and yaw can be determined using epipolar search and triangulation. For example, during calibration, the structured light pattern is registered to one or more pixels of the camera. The structured light pattern shifts on the sensor when the relative pitch and/or yaw between the camera and the projector changes. Accordingly, pitch and yaw can be determined by monitoring the displacement of the structured light pattern on the sensor in the vertical and horizontal directions, respectively.

Figure 3:
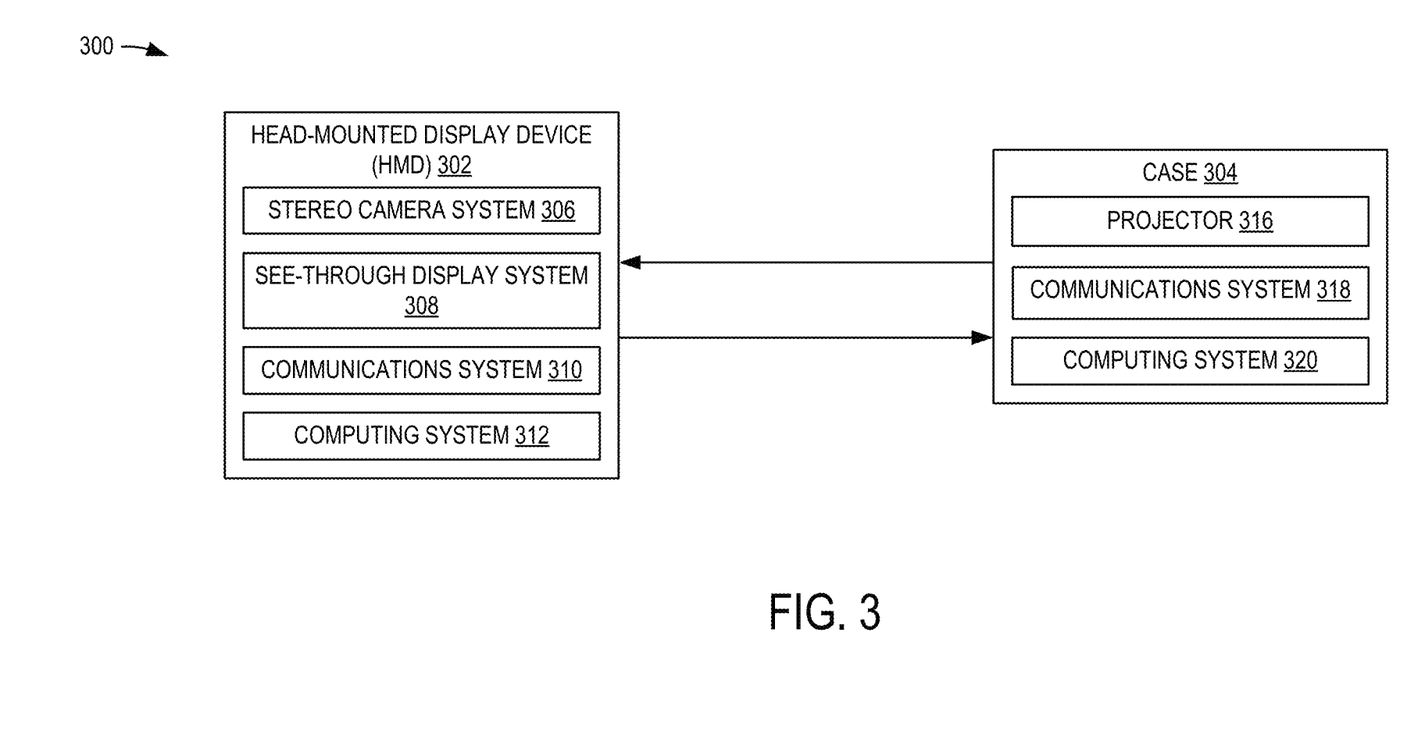
FIG. 3 shows a schematic diagram of an example system comprising an HMD device and a case for the HMD device, wherein the case includes a projector.

FIG. 3 shows a block diagram of an example system 300 comprising an HMD 302 and a case 304 for the HMD. As introduced above, the HMD 302 may include a stereo camera system 306. The HMD 302 further comprises a see-through display system 308, a first communications system 310, and a first computing system 312. The first computing system 312 is configured to control the display of images via the see-through display system 308 and to control communication with the case 304 via the first communications system 310.

The case 304 comprises a projector 316, a second communications system 318, and a second computing system 320. The second computing system 320 is configured to control the projector 316 to output illumination light into a surrounding environment and to control communication with the HMD 302 via the second communications system 318.

The projector 316 may be configured to output light having any suitable characteristics. In some examples, as mentioned above, the projector 316 may output structured light, while in other examples, the projector 316 may output unstructured light. Further, projector 316 may be configured to emit light in any suitable wavelength, including in the infrared (IR) and/or visible spectra. In various examples, output of the light may be triggered by an instruction received from the HMD device via the second computing system 320, by sensor data, and/or through user selection of a control (e.g., a switch on the case or the HMD device).

Figure 4:
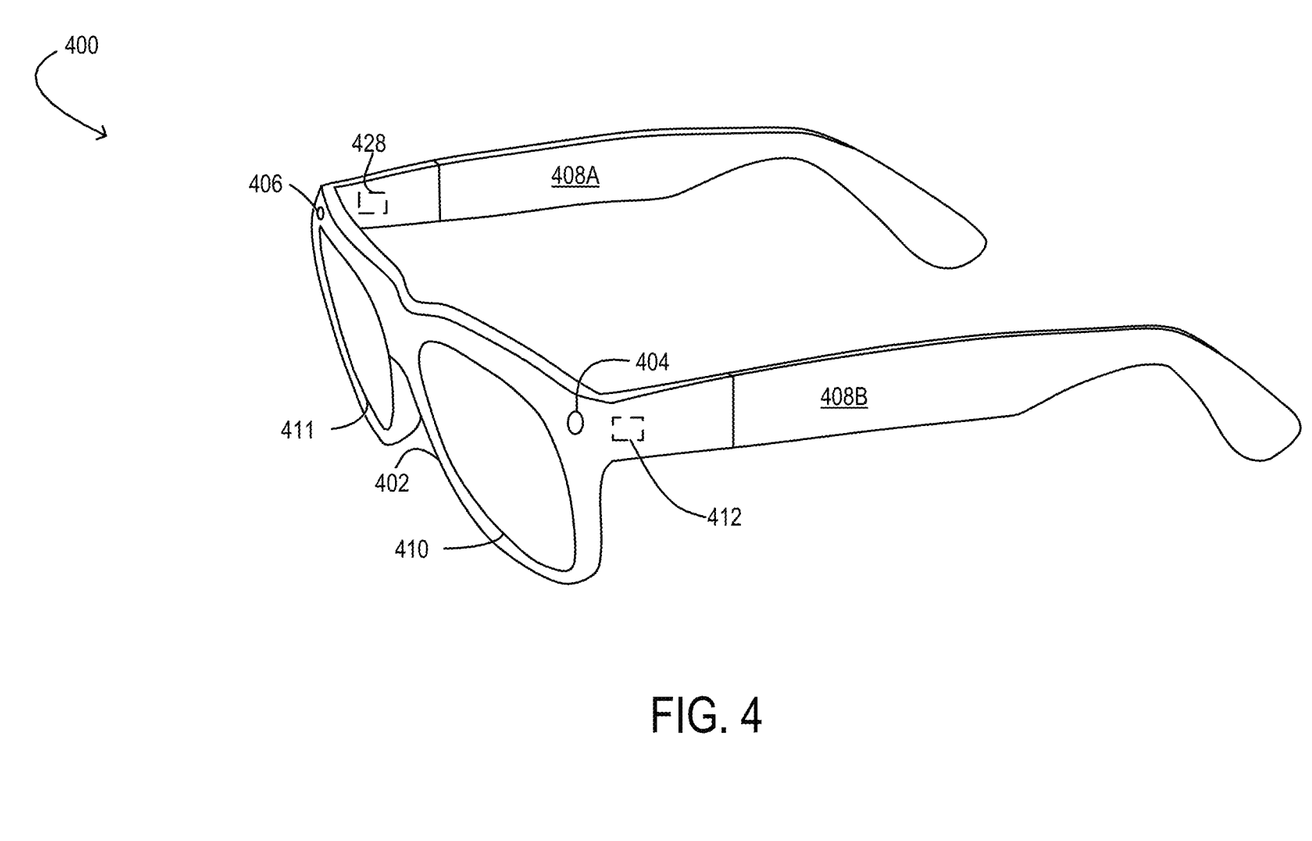
FIG. 4 shows an example HMD device.

FIG. 4 illustrates an example HMD device 400. HMD device 400 is an example of HMD device 104 of FIGS. 1 and 2, and of HMD device 302 of FIG. 3. The HMD device 400 comprises a frame 402, a first camera 404, a second camera 406, a display, and temple pieces 408A, 408B. The HMD device 400 display comprises a first display 410 and a second display 411 supported by the frame 402, wherein each of the first display 410 and the second display 411 takes the form of a waveguide configured to deliver a projected image to a respective eye of a user. The first camera 404 and the second camera 406 are located respectively at left and right sides of the frame 402, wherein each of the first camera and the second camera are located on the frame adjacent to an outer edge of the frame. The first camera 404 and the second camera 406 can be operated as a stereoscopic camera pair to make indirect depth measurements.

HMD device 400 further comprises a first display module 412 positioned adjacent to the first camera 404 for displaying a first image of the stereo image and a second display module 428 positioned adjacent to the second camera 406 for displaying a second image of the stereo image. Each display module may comprise any suitable display technology, such as a scanned beam projector, a microLED (light emitting diode) panel, a microOLED (organic light emitting diode) panel, or a LCoS (liquid crystal on silicon) panel, as examples. Further, various optics, such as the above-mentioned waveguides, one or more lenses, prisms, and/or other optical elements may be used to deliver displayed images to a user's eyes.

Figure 5:
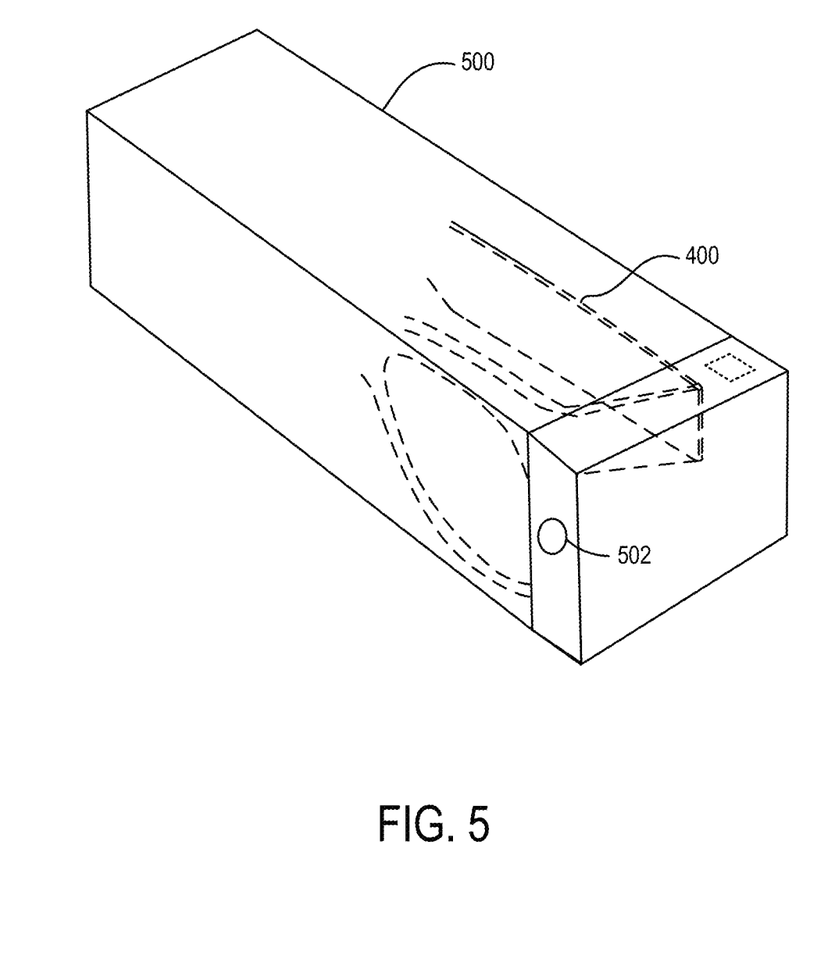
FIG. 5 shows an example HMD device case comprising a projector.

FIG. 5 shows an example case 500 for an HMD device. The case 500 is configured to house the HMD device (e.g., HMD device 400) when it is not in use. The case 500 further includes a projector 502 configured to emit illumination light, as illustrated in FIG. 2. As mentioned above, the projector 502 may be configured to emit structured or unstructured light of any suitable wavelength to assist an HMD device in depth sensing.

Figure 6:
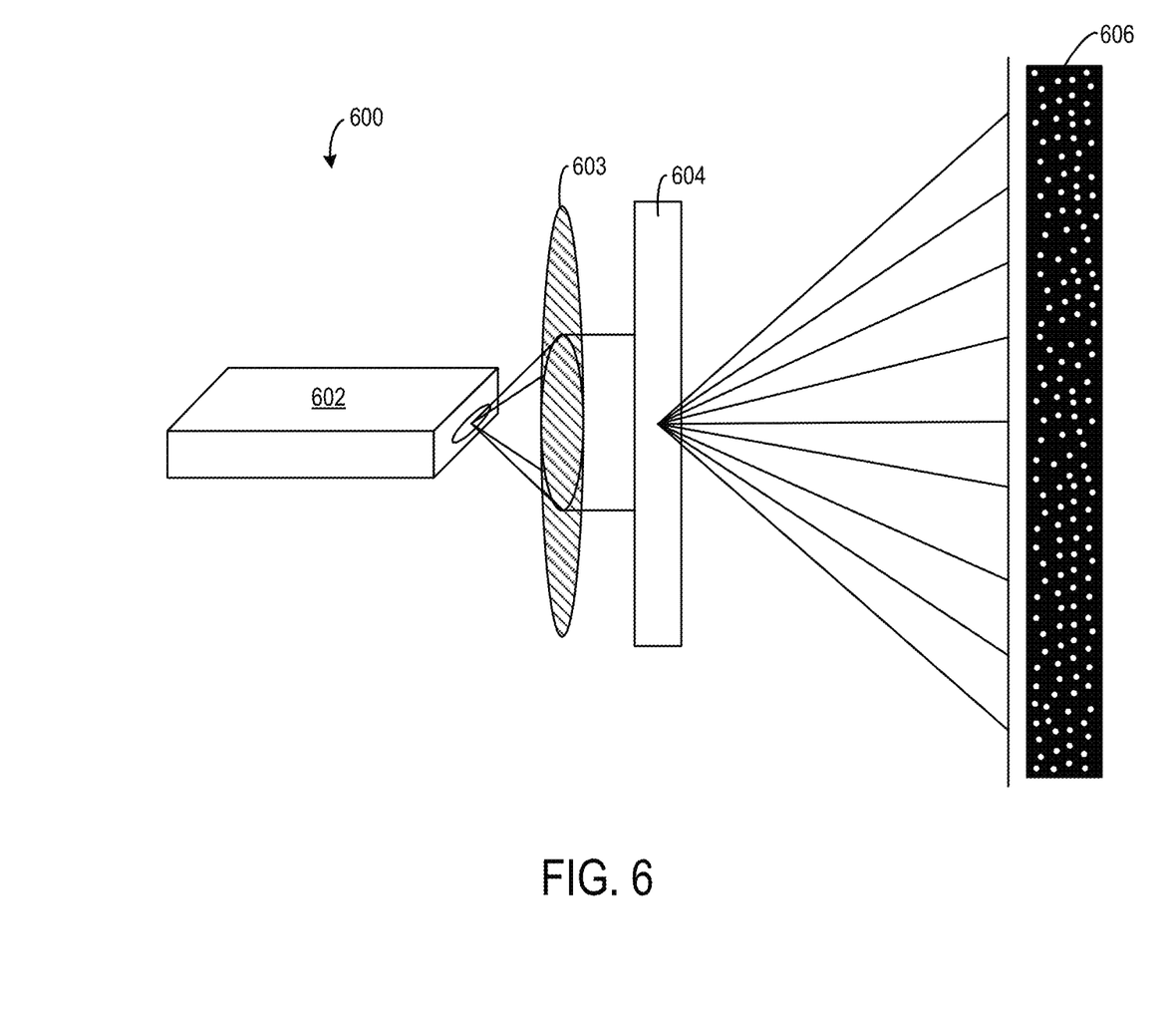
FIG. 6 shows an example of a structured light projector suitable for incorporation within the case of FIG. 5.
Figure 7:
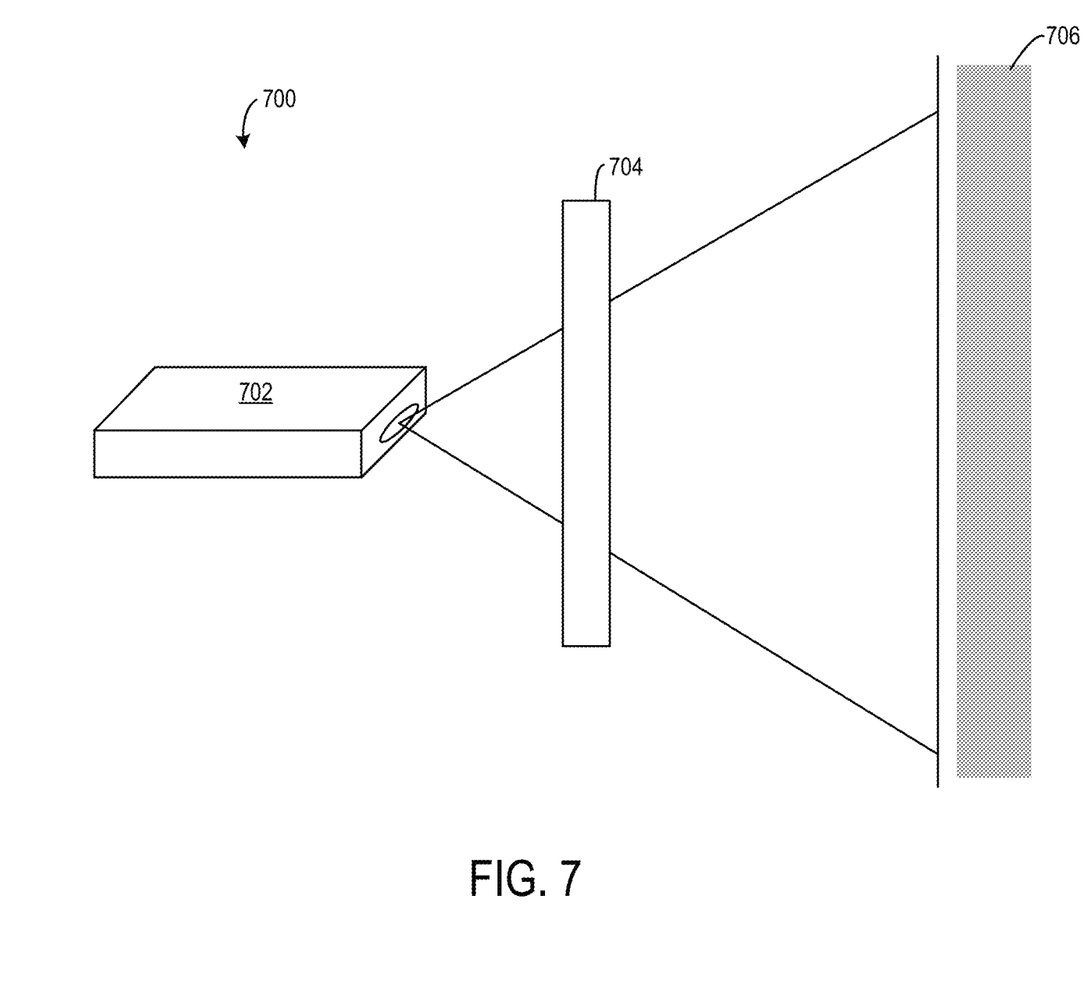
FIG. 7 shows an example of an unstructured light projector suitable for incorporation within the case of FIG. 5.

FIGS. 6 and 7 illustrate examples of projectors suitable for incorporation within the case of FIG. 5. First, FIG. 6 shows an example of a structured light projector 600 including a coherent light emitter 602, a collimating lens 603, and a pattern-generating element comprising a diffractive optical element 604, wherein the diffractive optical element 604 is configured to create a structured light pattern using coherent light emitted by the light emitter 602. In the illustrated example, the predetermined structured light pattern 606 comprises a speckle pattern. The dots of the speckle pattern can have any suitable size and density. In some examples, dots of a light pattern may be uniformly spaced in one or two dimensions, while in other examples a pattern of dots may be irregular, such as a random pattern. It will be appreciated that the predetermined structured light pattern described above and illustrated in FIG. 6 is presented for example, and that a structured light pattern emitted by a projector on a wearable device case may take any other suitable form.

In some examples, a same structured light pattern may be used across a population of devices. In such examples, the pattern can be factory calibrated such that the HMD may recognize and use the pattern to extract depth and/or topography information for one or more objects in the surrounding environment. In other examples, such as where a random pattern is used, devices across a population may use different patterns.

FIG. 7 illustrates an example of an unstructured light projector 700 including a light emitter 702 and projection optics 704. The unstructured light projector 700 is configured to emit unstructured light 706. The projection optics 704 may include any suitable optical components. In some examples, the projection optics 704 comprise an optical diffuser, such as a micro-lens array or a diffractive optical element. In other examples, any other suitable diffusers may be used. Likewise, the light emitter 702 also may take any suitable form. In some examples, the light emitter 702 comprises a coherent light source, such as a laser diode. In other examples, the light emitter 702 comprises a light emitting diode. It will be appreciated that the example light emitters and optical components described above are presented for the purpose of example, and that any other suitable optical configurations may be used to generate the structured light pattern 606 of FIG. 6 and unstructured light 706 of FIG. 7.

In some examples, the stereo cameras of the HMD each may include an image sensor configured to sense both visible and infrared wavelengths. In such an example, the stereo cameras may comprise an infrared band pass filter configured to filter out infrared light outside of a wavelength band of the light emitter 702 to reduce noise from other infrared bands. In other examples, the stereo cameras may operate in one or the other of the visible and infrared wavelength ranges, depending upon the wavelengths of light output by the light emitter 702 on the case.

Figure 8:
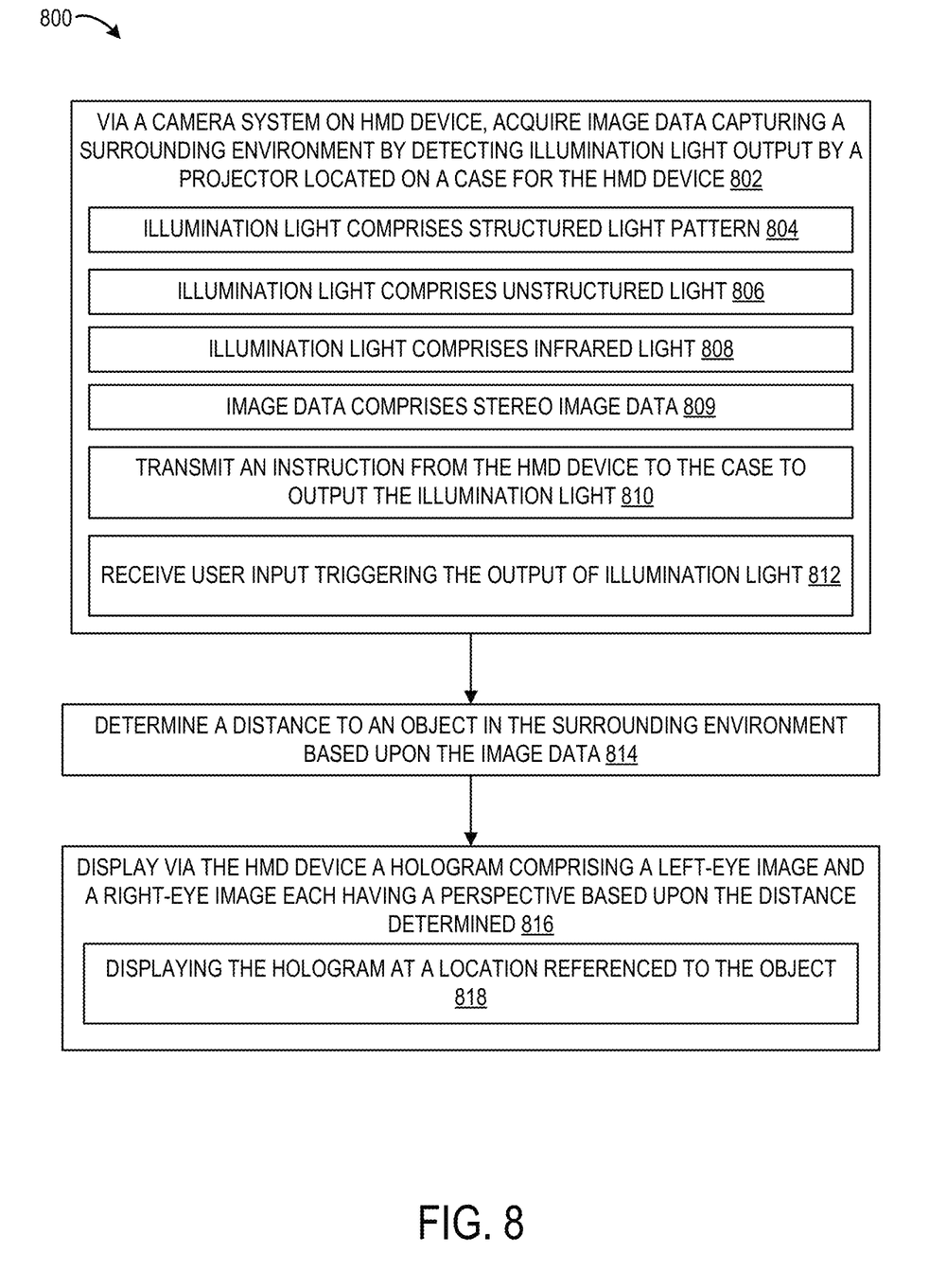
FIG. 8 shows a flow diagram depicting an example method for displaying a hologram via an HMD device using illumination light output by a projector located on a case for the HMD device.

FIG. 8 illustrates a flowchart depicting an example method 800 for displaying a hologram via an HMD device. The following description of method 800 is provided with reference to the software and hardware components described above and shown in FIGS. 1-7 and 9 but can be used with any other suitable display device, including devices with a single image sensor, as opposed to stereo camera systems. In various examples, the method 800 may be performed at an HMD device, a case for an HMD device, a device remote to the HMD device and the case, or distributed between two or more such devices. It will be appreciated that the following description of method 800 is provided by way of example and is not meant to be limiting. Various steps of method 800 can be omitted or performed in a different order than described, and method 800 can include additional and/or alternative steps relative to those illustrated in FIG. 8 without departing from the scope of this disclosure.

The method 800 includes, at 802, via a camera system on the HMD, acquiring image data capturing a surrounding environment by detecting illumination light output by a projector located on a case for the HMD device. In some examples, as indicated at 804, the illumination light may comprise a structured light pattern, while in other examples the illumination light may comprise unstructured light, as indicated at 806. Further, in some examples, the illumination light may comprise infrared light, as indicated at 808, while in other examples the illumination light may comprise any other suitable wavelengths, including visible wavelengths. Also, in some examples, as indicated at 809, the image data may comprise stereo image data captured by a stereo camera system on the HMD device.

As an example, referring again to FIG. 2, the case 110 is placed on the table 108 such that illumination light 112 output by the case 110 encompasses a portion of the table 108. As illustrated by example in FIG. 2, the case 110 may be shaped such that it can be set on the table 108 or any other suitable surface and illuminate at least a portion of the real-world environment without the use of a stand. Any suitable mechanism may be used to trigger the case to output the illumination light. For example, referring again to FIG. 8, method 800 may include, at 810, transmitting an instruction from the HMD device to the case to output the illumination light. Such an instruction may be transmitted based upon any suitable conditions, such as the HMD device failing to track objects in a dark environment and/or a sensed ambient light level dropping below a threshold. In other examples, output of the illumination light may be triggered by a user input, e.g. pushing a button on the case, or making any suitable input via a user input mechanism of the HMD device, as indicated at 812.

At 814, the method 800 includes determining a distance to an object in the surrounding environment based upon the image data. For example, the HMD device 104 of FIG. 2 may process the image data to determine a distance from the HMD device 104 to a flat surface (e.g., an edge 114 of the table 108) in the environment.

Continuing, at 816, the method 800 includes displaying a hologram via the HMD device. As introduced above, the hologram comprises a stereoscopic image comprising a left-eye image and a right-eye image. The left-eye image and the right-eye image each have a perspective that is based upon the distance to the object in the surrounding environment determined above based upon the image data. For example, the hologram 106 of FIG. 2 is configured to be displayed adjacent to the edge 114 of the table 108. Accordingly, the HMD 104 may compute a perspective for the left-eye image and the right-eye image based upon the image data such that the hologram 106 appears at the appropriate position to the user 102. As indicated at 818, the hologram may be displayed at a location referenced to an object. For example, the hologram 106 of FIG. 2 may be displayed at a location adjacent to the table 108. By detecting the illumination light 112 reflected of the table 108, the hologram 106 may be displayed at an appropriate location even in a dark environment.

In some embodiments, the methods and processes described herein may be tied to a computing system of one or more computing devices. In particular, such methods and processes may be implemented as a computer-application program or service, an application-programming interface (API), a library, and/or other computer-program product.

Figure 9:
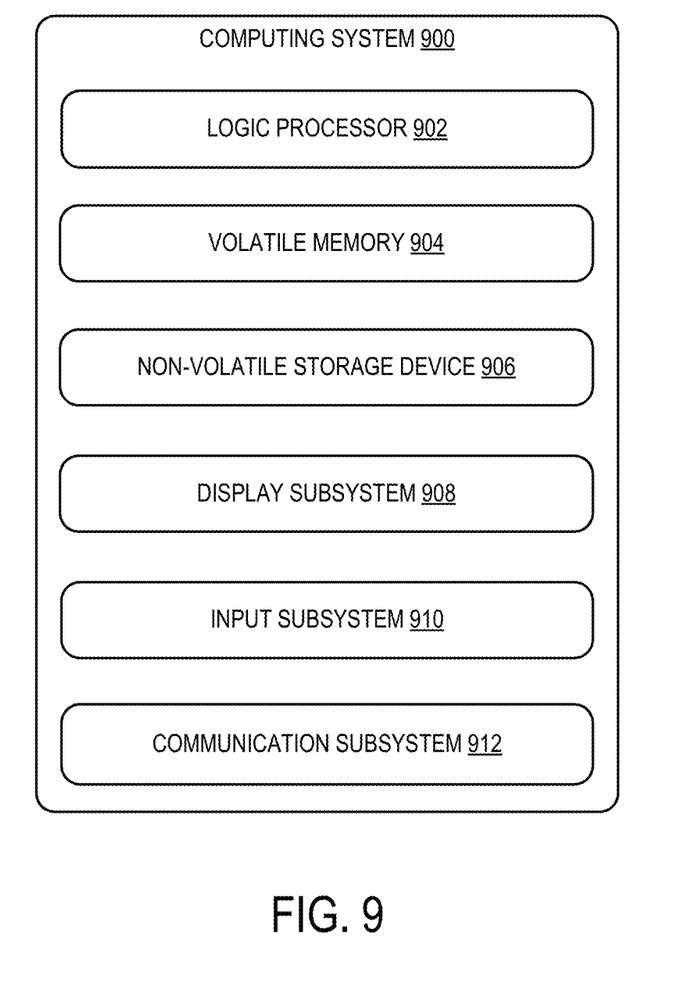
FIG. 9 shows a schematic diagram of an example computing system.

FIG. 9 schematically shows an example of a computing system 900 that can enact one or more of the devices and methods described above. Computing system 900 is shown in simplified form. Computing system 900 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head-mounted augmented reality devices. In some examples, the computing system 900 may embody the HMD device 104, the case 110, the HMD device 302, the case 304, the HMD device 400, and/or the case 500. The computing system 900 includes a logic processor 902 volatile memory 904, and a non-volatile storage device 906. The computing system 900 may optionally include a display subsystem 908, input subsystem 910, communication subsystem 912, and/or other components not shown in FIG. 9.

Logic processor 902 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 902 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 906 includes one or more physical devices configured to hold instructions executable by the logic processors to implement the methods and processes described herein. When such methods and processes are implemented, the state of non-volatile storage device 906 may be transformed—e.g., to hold different data.

Non-volatile storage device 906 may include physical devices that are removable and/or built-in. Non-volatile storage device 906 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 906 may include nonvolatile, dynamic, static, read/write, read-only, sequential-access, location-addressable, file-addressable, and/or content-addressable devices. It will be appreciated that non-volatile storage device 906 is configured to hold instructions even when power is cut to the non-volatile storage device 906.

Volatile memory 904 may include physical devices that include random access memory. Volatile memory 904 is typically utilized by logic processor 902 to temporarily store information during processing of software instructions. It will be appreciated that volatile memory 904 typically does not continue to store instructions when power is cut to the volatile memory 904.

Aspects of logic processor 902, volatile memory 904, and non-volatile storage device 906 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The term "program" may be used to describe an aspect of computing system 900 typically implemented in software by a processor to perform a particular function using portions of volatile memory, which function involves transformative processing that specially configures the processor to perform the function. Thus, a program may be instantiated via logic processor 902 executing instructions held by non-volatile storage device 906, using portions of volatile memory 904. It will be understood that different programs may be instantiated from the same application, service, code block, object, library, routine, API, function, etc. Likewise, the same program may be instantiated by different applications, services, code blocks, objects, routines, APIs, functions, etc. The term "program" may encompass individual or groups of executable files, data files, libraries, drivers, scripts, database records, etc.

When included, display subsystem 908 may be used to present a visual representation of data held by non-volatile storage device 906. The visual representation may take the form of a graphical user interface (GUI). As the herein described methods and processes change the data held by the non-volatile storage device, and thus transform the state of the non-volatile storage device, the state of display subsystem 908 may likewise be transformed to visually represent changes in the underlying data. Display subsystem 908 may include one or more display devices utilizing virtually any type of technology. Such display devices may be combined with logic processor 902, volatile memory 904, and/or non-volatile storage device 906 in a shared enclosure, or such display devices may be peripheral display devices.

When included, input subsystem 910 may comprise or interface with one or more user-input devices such as a keyboard, mouse, touch screen, or game controller. In some examples, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 912 may be configured to communicatively couple various computing devices described herein with each other, and with other devices. Communication subsystem 912 may include wired and/or wireless communication devices compatible with one or more different communication protocols. For example, the communication subsystem may be configured for communication via a wireless telephone network, or a wired or wireless local- or wide-area network. In some examples, the communication subsystem may allow computing system 900 to send and/or receive messages to and/or from other devices via a network such as the Internet.

Another example provides, at a computing device, a method for displaying a hologram via a HMD device, the method comprising: via a camera system on the HMD device, acquiring image data capturing a surrounding environment by detecting illumination light output by a projector located on a case for the HMD device; determining a distance to an object in the surrounding environment based upon the image data; and displaying via the HMD device the hologram, the hologram comprising a left-eye image and a right-eye image each having a perspective based upon the distance determined. The illumination light may additionally or alternatively include a structured light pattern. Determining the distance to the object in the surrounding environment may additionally or alternatively include determining a relative orientation of the camera system with respect to the projector by starting from an initial calibration between the camera system, and determining a rotation about one or more of a roll axis, a pitch axis and a yaw axis to calibrate the camera system to the projector. The structured light pattern may additionally or alternatively include a speckle pattern. The illumination light may additionally or alternatively include infrared light. The illumination light may additionally or alternatively include unstructured light. The method may additionally or alternatively include transmitting an instruction from the HMD device to the case to output the illumination light. The image data may additionally or alternatively include stereo image data. The illumination light may be additionally or alternatively output from the projector based at least upon determining that a brightness level of the surrounding environment is at or below a threshold environmental brightness level.

Another example provides a system comprising: a HMD device including a camera system; a case for the HMD device, the case including a projector; a processor; and a memory storing instructions executable by the processor to, output illumination light from the projector located on the case into a surrounding environment; via the camera system on the HMD device, acquire image data capturing the surrounding environment by detecting the illumination light output by the projector located on the case for the HMD device; determine a distance to an object in the surrounding environment based upon the image data; and display via the HMD device a hologram comprising a left-eye image and a right-eye image each having a perspective based upon the distance determined. The illumination light may additionally or alternatively include a structured light pattern. The illumination light may additionally or alternatively include unstructured light. The instructions may be additionally or alternatively executable to display the hologram at a location referenced to the object. The instructions may be additionally or alternatively executable to transmit an instruction for the case to output the illumination light. The camera system may additionally or alternatively include a stereo camera system. The instructions may be additionally or alternatively executable to output the illumination light based at least upon determining that a brightness level of the surrounding environment is at or below a threshold environmental brightness level.

Another example provides a system comprising: a HMD device and a case for the HMD device, the HMD device comprising a see-through display system, a first communications system, and a first computing system configured to control display of images via the see-through display system and to control communication with the case via the first communications system; and the case comprising a projector configured to output a structured infrared light pattern into a surrounding environment, a second communications system, and a second computing system configured to control the projector to output the structured infrared light pattern and to control communication with the HMD device via the second communications system. The first computing system may be additionally or alternatively configured to execute stored instructions to: via a stereo camera system on the HMD device, acquiring stereo image data capturing the surrounding environment by detecting the structured infrared light pattern output by the projector; determining a distance to an object in the surrounding environment based upon the stereo image data; and displaying via the HMD device a hologram comprising a left-eye image and a right-eye image each having a perspective based upon the distance determined. The HMD device may be additionally or alternatively configured to transmit an instruction to the case to output the structured infrared light pattern. The structured infrared light pattern may be additionally or alternatively output from the projector based at least upon determining that a brightness level of the surrounding environment is at or below a threshold environmental brightness level.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. On a computing system comprising a head-mounted display (HMD) device and a case for the HMD device, the HMD device comprising a stereo camera system, a method for displaying a hologram via the HMD device, the method comprising:
   detecting a trigger condition related to an ambient light level while the HMD device is removed from the case and while the HMD device is imaging a surrounding environment via the stereo camera system;
   based at least upon the trigger condition, transmitting an instruction from the HMD device to a projector located on the case to output illumination light;
   acquiring stereo image data of the capturing a surrounding environment by detecting the illumination light output by the projector;
   determining a distance to an object in the surrounding environment based upon the stereo image data; and
   displaying via the HMD device the hologram, the hologram comprising a left-eye image and a right-eye image each having a perspective based upon the distance determined.

2. The method of claim 1, wherein the illumination light comprises a structured light pattern.

3. The method of claim 2, wherein determining the distance to the object in the surrounding environment comprises determining a relative orientation of the camera system with respect to the projector by starting from an initial calibration between the camera system, and determining a rotation about one or more of a roll axis, a pitch axis and a yaw axis to calibrate the camera system to the projector.

4. The method of claim 2, wherein the structured light pattern comprises a speckle pattern.

5. The method of claim 1, wherein the illumination light comprises infrared light.

6. The method of claim 1, wherein the illumination light comprises unstructured light.

7. The method of claim 1, wherein detecting the trigger condition related to the ambient light level comprises determining that a brightness level of the surrounding environment is at or below a threshold environmental brightness level.

8. A system comprising:
   a head-mounted display (HMD) device including a stereo camera system;
   a case for the HMD device, the case including a projector;
   a processor; and
   a memory storing instructions executable by the processor to,
      detect a trigger condition related to an ambient light level while the HMD device is removed from the case and while the HMD device is imaging a surrounding environment via the stereo camera system;
      based at least upon the trigger condition, transmit an instruction from the HMD device to a projector located on the case to output illumination light;
      acquire stereo image data of the surrounding environment by detecting the illumination light output by the projector;
      determine a distance to an object in the surrounding environment based upon the stereo image data; and
      display via the HMD device a hologram comprising a left-eye image and a right-eye image each having a perspective based upon the distance determined.

9. The system of claim 8, wherein the illumination light comprises a structured light pattern.

10. The system of claim 8, wherein the illumination light comprises unstructured light.

11. The system of claim 8, wherein the instructions are further executable to display the hologram at a location referenced to the object.

12. The system of claim 8, wherein the instructions are further executable to transmit an instruction for the case to output the illumination light.

13. The system of claim 8, wherein the trigger condition comprises a determination that a brightness level of the surrounding environment is at or below a threshold environmental brightness level.

14. A system comprising:
   a head-mounted display (HMD) device and a case for the HMD device,
   the HMD device comprising
      a see-through display system,
      a stereo camera system configured to track an object in a surrounding environment,
      a first communications system, and
      a first computing system configured to control display of images via the see-through display system and to control communication with the case via the first communications system, wherein the first computing system is configured to
         detect a trigger condition related to an ambient light level while the HMD device is removed from the case and while the HMD device is imaging the surrounding environment via the stereo camera system, and based at least upon the trigger condition, transmit, via the first communications system, an instruction from the HMD device to the case to output a structured infrared light pattern; and the case comprising a projector configured to output the structured infrared light pattern into the surrounding environment, a second communications system, and a second computing system configured to control the projector to output the structured infrared light pattern and to control communication with the HMD device via the second communications system.

15. The system of claim 14, wherein the first computing system is configured to execute stored instructions to:

via the stereo camera system on the HMD device, acquiring stereo image data capturing the surrounding environment by detecting the structured infrared light pattern output by the projector;

determining a distance to the object in the surrounding environment based upon the stereo image data; and displaying via the HMD device a hologram comprising a left-eye image and a right-eye image each having a perspective based upon the distance determined.

16. The system of claim 14, wherein the trigger condition comprises a determination that a brightness level of the surrounding environment is at or below a threshold environmental brightness level.

17. The method of claim 1, wherein detecting the trigger condition related to the ambient light level comprises detecting that the HMD device has failed to track the object.

18. The method of claim 2, wherein the structured light pattern comprises a different pattern than a second structured light pattern output by a second case.

19. The system of claim 8, wherein the trigger condition comprises a determination that the HMD device has failed to track the object.

20. The system of claim 14, wherein the trigger condition comprises a determination that the HMD device has failed to track the object in the surrounding environment.

* * * * *